(12) United States Patent
Hong

(10) Patent No.: US 7,092,061 B2
(45) Date of Patent: Aug. 15, 2006

(54) FLAT DISPLAY DEVICE

(75) Inventor: Soon Kwang Hong, Taegu-kwangyokshi (KR)

(73) Assignee: LG.Philips LCD Co., LTD, Seoul (KR)

( * ) Notice: Subject to any disclaimer, the term of this patent is extended or adjusted under 35 U.S.C. 154(b) by 0 days.

(21) Appl. No.: 10/420,462

(22) Filed: Apr. 23, 2003

(65) Prior Publication Data
US 2004/0032553 A1    Feb. 19, 2004

(30) Foreign Application Priority Data
Aug. 16, 2002    (KR)    ............ 10-2002-0048490

(51) Int. Cl.
*G02F 1/1345*    (2006.01)
(52) U.S. Cl. ............... 349/149; 349/152
(58) Field of Classification Search ........ 349/138–139, 349/146–147, 149–152
See application file for complete search history.

(56) References Cited

U.S. PATENT DOCUMENTS

| 4,653,862 | A | * | 3/1987 | Morozumi | 349/109 |
| 4,834,507 | A | * | 5/1989 | Kato et al. | 349/145 |
| 5,822,026 | A | * | 10/1998 | Matsuo | 349/38 |
| 6,115,097 | A | * | 9/2000 | Yamazaki | 349/151 |
| 6,337,284 | B1 | | 1/2002 | Hwang et al. | 438/710 |
| 6,498,369 | B1 | | 12/2002 | Yamazaki et al. | 257/72 |
| 6,545,731 | B1 | * | 4/2003 | Melnik et al. | 349/44 |
| 6,774,969 | B1 | * | 8/2004 | Ma et al. | 349/139 |

FOREIGN PATENT DOCUMENTS

| CN | 1272695 A | 11/2000 |
| KR | 00222896 | 7/1999 |

* cited by examiner

*Primary Examiner*—Dung T. Nguyen
(74) *Attorney, Agent, or Firm*—McKenna, Long & Aldridge, LLP

(57) ABSTRACT

A flat display device including an active area for displaying an image and a non-active area for lines in which drive circuits apply data signals to the image display area from signal lines the device including a first signal layer of first signal lines in the non-active area, a second signal layer of second signal lines in the non-active area, and a first insulating layer between the first and second layers.

14 Claims, 8 Drawing Sheets

FLAT DISPLAY DEVICE

This application claims the benefit of Korean Application No. P2002-48490 filed in Korea on Aug. 16, 2002, which is hereby incorporated by reference in its entirety.

BACKGROUND OF THE INVENTION

1. Field of the Invention

The present invention relates to a flat display device, and more particularly, to an LCD panel with integrated driving circuits.

2. Discussion of the Related Art

As the information society develops, demands for various types of display devices increase. Accordingly, many efforts have been made to research and develop various flat display devices such as liquid crystal display (LCD), plasma display panel (PDP), electroluminescent display (ELD), and vacuum fluorescent display (VFD), and some species of the flat display devices are already applied to display devices of various equipments. Among various flat display devices, the LCD device has been used most widely as a mobile display while replacing a CRT (Cathode Ray Tube) because of its advantages, such as excellent picture quality, lightweight, thin profile, and low power consumption. In addition to the mobile type LCD device, such as a display for a notebook computer, the LCD device has been developed for computer monitors and televisions.

The LCD device includes two substrates facing each other with a liquid crystal injected in between the two substrates. The liquid crystal has a different alignment direction according to temperature or density of the liquid crystal. Liquid crystal has both the fluidity of a liquid material and crystalline characteristics of a solid material. That is, a liquid crystal lies between the solid and the liquid phase, which is like a state just before a melting solid becomes a liquid. When a light is irradiated onto the liquid crystal, or an electric or magnetic field is applied to the liquid crystal, the liquid crystal has the birefringence of an optical anisotropic crystal. Also, the liquid crystal has the characteristics of both the liquid and solid within a predetermined temperature range.

FIG. 1 is a perspective view illustrating a related art LCD device including a liquid crystal display (LCD) panel for displaying an image from a driving circuit that generates a video signal. As shown in FIG. 1, the LCD device includes a plurality of gate lines 14 and data lines 16 that are formed on a first substrate 21 in a matrix. Thin film transistors 13 are formed where the gate lines 14 and data lines cross over each other. Then, a color filter with a black matrix 23 and common electrode 24 are sequentially formed on a side of a second substrate 22 that opposes the first substrate 21. A liquid crystal 25 is positioned between the first and second substrates 21 and 22. The common electrode 24 faces pixel electrodes 26 formed on the first substrate 21 such that each of the pixel electrodes together with the liquid crystal 25 and the common electrode 24 define a pixel of the related art LCD device.

As shown in FIG. 2, each of the thin film transistors 13 includes a gate electrode 30 made of a metal, such as aluminum Al, chrome Cr, or molybdenum Mo. Further, each of the thin film transistors 13 includes source electrode 32 and drain electrode 33 made of a metal, such as aluminum Al, chrome Cr, or molybdenum Mo. A semiconductor layer 34 is positioned in between the source electrode 32 and the drain electrodes 33. Impurity semiconductor layers 36 are respectively provided between the semiconductor layer 34, and the source electrode 32 and drain electrodes 33. The gate electrode 30 is connected to the gate line 14 shown in FIG. 1, the source electrode 32 is connected to the data line 16 shown in FIG. 1, and the drain electrode 33 is connected to the pixel electrode 26. When a scanning voltage is applied to the gate electrode 30 through the gate line 14, the thin film transistor is operated so as to apply a data voltage from the data line 16 to the pixel electrode 26.

The data voltage applied to the pixel electrode 26 through the thin film transistor generates a voltage difference between the pixel electrode 26 and the common electrode 24. The voltage difference changes the arrangement of the liquid crystal 25 between the pixel electrode 26 and the common electrode 24 such that light transmittance characteristics of the pixel are changed. Thus, a visual image can be created with the pixels of an LCD device according to data voltages applied to the pixels.

Recently, the trend in LCD devices has been higher resolutions at larger sizes. Further, efforts have been made to manufacture the active region display part and the driving circuits for the display part on the same substrate. The driving circuits should use thin film transistors having a high mobility as switching device for high speed switching of video signals. However, the thin film transistor (TFT) in driving circuits formed on the same substrate of the display part in the related art includes the same amorphous hydride silicon (a-Si:H) with low mobility as the semiconductor layer 34 of the TFTs of the pixels. Thus, the related art LCD device has problems in achieving higher resolutions at larger sizes that require high speed switching of video signals.

A method for overcoming the switching problem is to use a polycrystalline-silicon TFT (Poly-Si TFT) instead of amorphous hydride silicon TFTs. More particularly, the polycrystalline-silicon TFTs are used in the driving circuits, which are integrated into the LCD panel. Also, active layers of the TFTs in the pixel, such as the semiconductor layer 34 in FIG. 2, are made of polycrystalline silicon, thereby preventing image blur due to slow switching in the pixels. Furthermore, because a process step, such as of Chip On Glass (COG) or Tape Automated Bonding (TAB), for connecting the driving circuit (driver IC) to the LCD panel does not have to be performed since driving circuits are formed on the same substrate as the active region, manufacturing costs are decreased.

FIG. 3 is a cross-sectional view illustrating a related art LCD panel using polycrystalline-silicon TFTs. As shown in FIG. 3, the LCD panel of the related art LCD panel includes an active region 1 for displaying an image, a data driving circuit 2, a gate driving circuit 3, and an input terminal 4. The data driving circuit 2 is integrated into the LCD panel for driving data lines 5 in the active region 1. The gate driving circuit 3 is integrated into the LCD panel for driving gate lines 6 in the active region 1. The input terminal 4 is integrated into the LCD panel for providing a data signal to charge the data lines 5, a first power signal to operate the gate driving circuit 3, a second power signal to operate the data driving circuit 2, an electrostatic discharge protection circuit, and a control signal to control the gate driving circuit 3 and the data driving circuit 2. The data driving circuit 2 is separated from the gate driving circuit 3 such that the data driving circuit 2 applies signals to the data lines 5 and the gate driving circuit 3 applies signals to the gate lines 6.

As shown in FIG. 4, data lines 45 are divided into blocks, which each receive video signals from the plurality of signal lines S1–Sn through a plurality of switching devices 46. Each of the blocks includes a shift register 43 and a buffer 44 for driving data lines 45 divided into "m" blocks. The plurality of signal lines S1–Sn are formed so as to transmit a video signal output from a digital-to-analog converter (not shown) to each of the data lines 45. The plurality of switching devices 46 sequentially applies the video signals of the signal lines S1–Sn to the data lines for each block according to driving signals output from the shift registers 43 and the buffers 44. It is possible to drive the data lines 45 divided into "m" blocks since the active layers of the TFTs in the pixels are made of polycrystalline silicon having a high electron mobility.

The driving circuits of the related art LCD panel using polycrystalline silicon TFTs is different from a related art driving circuits using amorphous hydride silicon TFTs in that the respective data lines are divided into "m" blocks so as to decrease the number of contact lines between the panel and an external circuit during selecting the gate line, whereby a display voltage is sequentially provided to the data line. The related art LCD panel using polycrystalline silicon TFTs has other advantages. For example, if the LCD panel is a reflecting type LCD panel, the LCD panel includes multi-layered metals for the gate electrode, the source/drain electrodes, a reflecting electrode and a pixel electrode, and an insulating layer.

The plurality of signal lines S1–Sn of FIG. 4 is single layer structure that can be formed during the metallization process for forming either the gate electrodes, source/drain electrodes or pixel electrodes. As shown in FIG. 5A and FIG. 5B, a plurality of signal lines S1–Sn formed in a single layer requires the use of an area of the related art LCD device that cannot be used as an active region. The unused or non-active area that cannot be used in the active region increases in proportion to the number n of the signal lines S1–Sn.

SUMMARY OF THE INVENTION

Accordingly, the present invention is directed to a flat display device having integrated driving circuits that substantially obviates one or more of the problems due to limitations and disadvantages of the related art.

An object of the present invention is to minimize the non-active area or non-display area of a flat display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a flat display device includes an active area for displaying an image and a non-active area for lines in which drive circuits apply data signals to the image display area from signal lines, the device including a first signal layer of first signal lines in the non-active area, a second signal layer of second signal lines in the non-active area, and a first insulating layer between the first and second signals layers.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

FIGS. 6A to 6F illustrates manufacturing process steps of an LCD device having integrated driving circuits. More specifically, FIGS. 6A to 6F are cross-sectional views of a pixel unit in an LCD panel having integrated driving circuits. Manufacturing process steps of the LCD panel for polycrystalline-silicon TFTs will be described referencing to the pixel unit of FIGS. 6A to 6F.

Figure 6A:
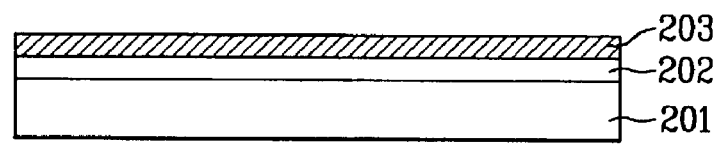
FIG. 6A to FIG. 6F illustrates manufacturing process steps of an LCD device according to an exemplary embodiment of the present invention.
Figure 6B:
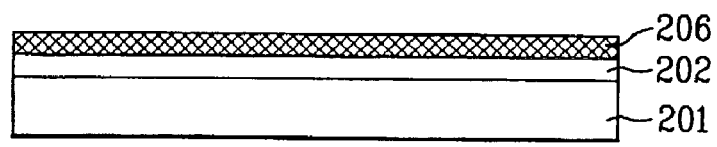

As shown in FIG. 6A, a buffer layer 202 of a silicon oxide material $SiO_2$ and an amorphous silicon layer (a-Si:H) 203 can be sequentially formed on a glass substrate 201 by a chemical vapor deposition (CVD) method. The buffer layer 202 prevents impurities of the glass substrate 201 from being diffused into the amorphous silicon layer 203. As shown in FIG. 6B, the amorphous silicon layer is crystallized to form a polycrystalline-silicon layer 206.

Among methods for crystallizing the amorphous silicon layer, a sequentially lateral solidification (SLS) method can be used, in which a lateral growth of silicon crystals is induced by laser, whereby superior single crystalline silicon is manufactured. In the SLS method, silicon grains grow perpendicular to an interface between liquid type silicon and solid type silicon. The silicon grains also grow laterally to a predetermined length by controlling laser energy of the laser beam crystallizing the amorphous silicon layer.

Figure 6C:
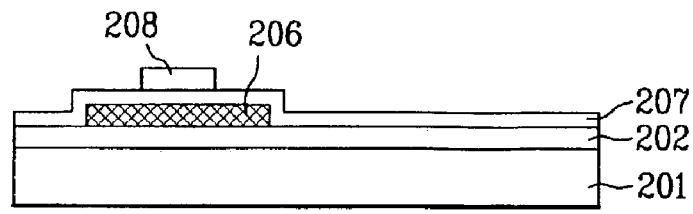

As shown in FIG. 6C, the polycrystalline silicon layer 206 is patterned into an island-shape to form an active layer for a thin film transistor (TFT). Then, a gate insulating layer 207 of a silicon oxide layer or a silicon nitride layer is formed over the entire surface of the glass substrate 201 including the polycrystalline-silicon layer 206. Subsequently, a metal layer is deposited and patterned on the gate insulating layer 207 by sputtering such that a gate line (not shown) having a gate electrode 208 is formed.

Figure 6D:
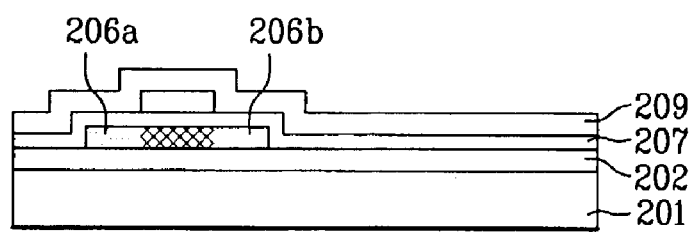
Figure 6E:
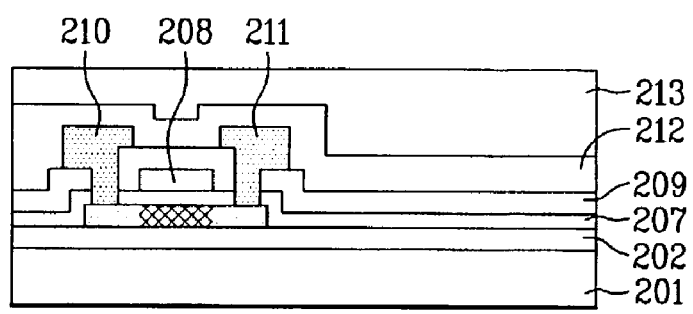

As shown in FIG. 6D, $n^+$ ions are injected into the polycrystalline-silicon layer 206 on both sides of the gate electrode 208 by an ion-injection process step using the gate electrode 208 as a mask such that source and drain regions 206a and 206b are formed. Then, an insulating interlayer 209 is formed over the entire surface of the glass substrate 201 including the gate electrode 208. Referring to FIG. 6E, the insulating interlayer 209 and the gate insulating layer 207 are selectively etched to form holes exposing the source and drain regions 206a and 206b. A metal layer is deposited so as to fill the holes, and then patterned to form source and drain electrodes 210 and 211. Then, first and second insulating layers 212 and 213 are sequentially deposited on the entire surface of the glass substrate 201.

Figure 1:
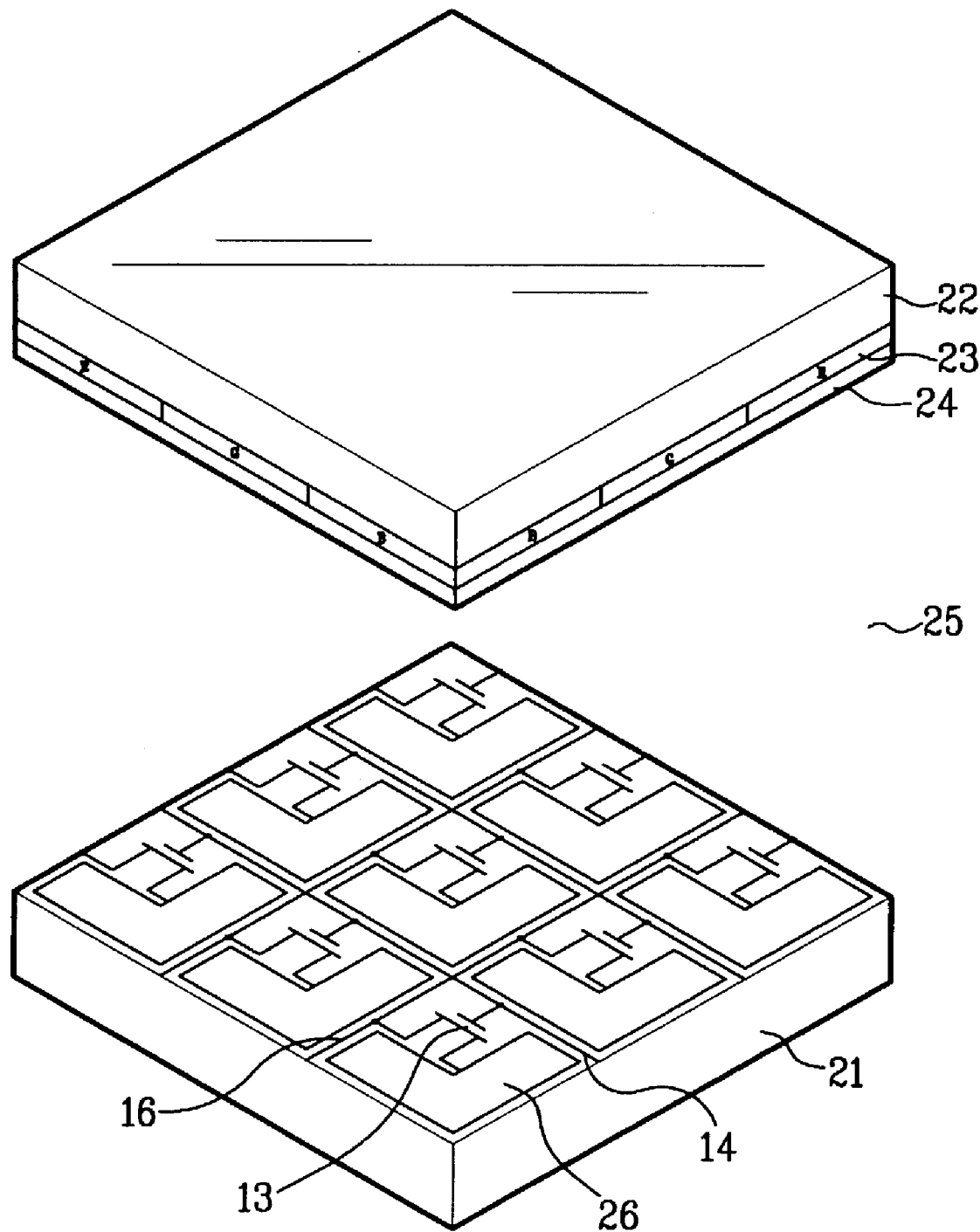
FIG. 1 is a perspective view illustrating a related art LCD panel.
Figure 2:
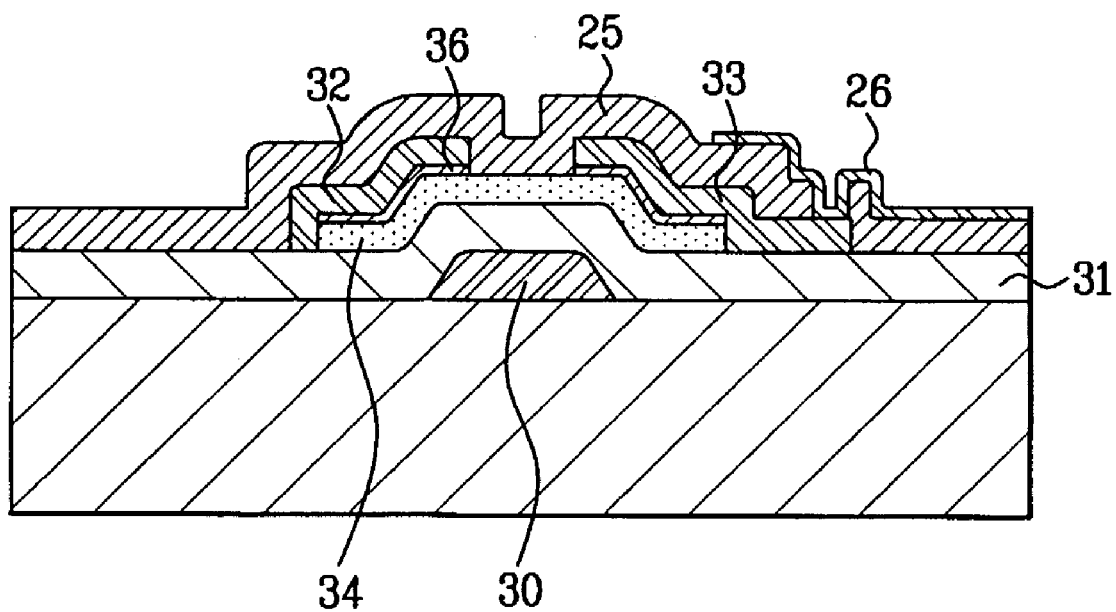
FIG. 2 is a cross-sectional view illustrating a related art TFT in the active region of an LCD panel.
Figure 3:
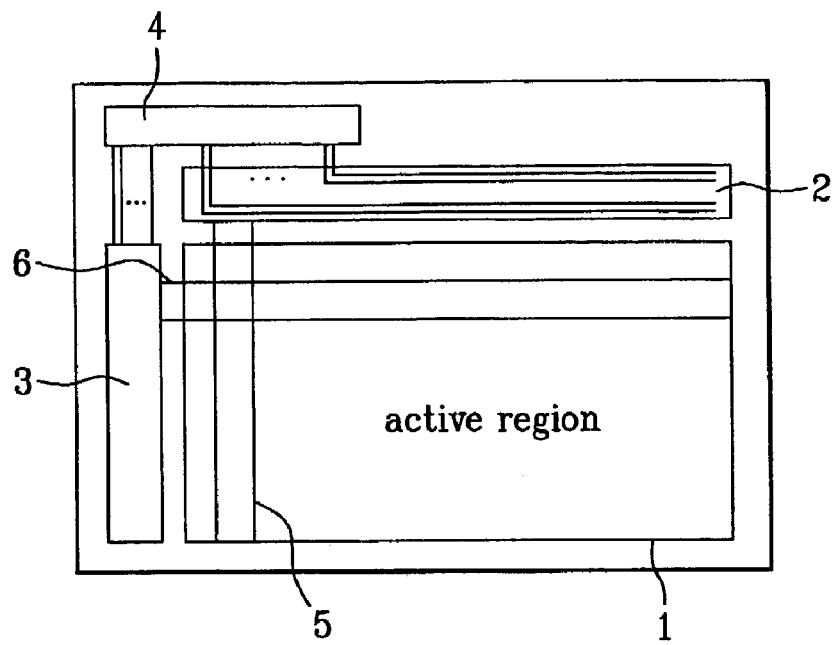
FIG. 3 is a cross-sectional view illustrating a related art LCD device having integrated driving circuits.
Figure 6F:
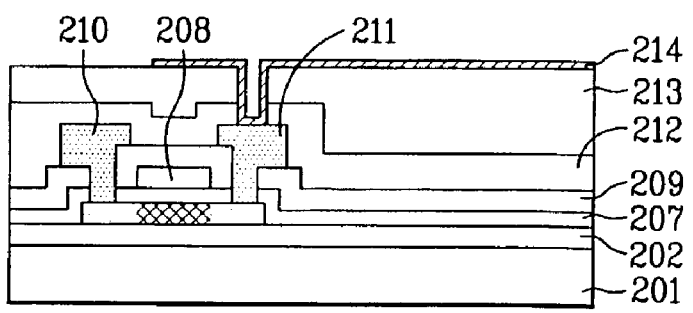

As shown in FIG. 6F, the first and second insulating layers 212 and 213 are selectively etched to form a contact hole exposing a predetermined portion of the drain electrode 211. A pixel electrode 214 is formed in a pixel region and contacted with the drain electrode 211 through the contact hole. A plurality of pixel units respectively having the aforementioned structure are combined to form an image display area shown in FIG. 3. At this time, in the manufacturing process steps, the gate electrode 208, the source and drain electrodes 210 and 211, and the pixel electrode 214 are made of the metal layers. Although not shown, in a reflecting type LCD panel, a reflecting electrode made of the metal layer is provided.

Figure 4:
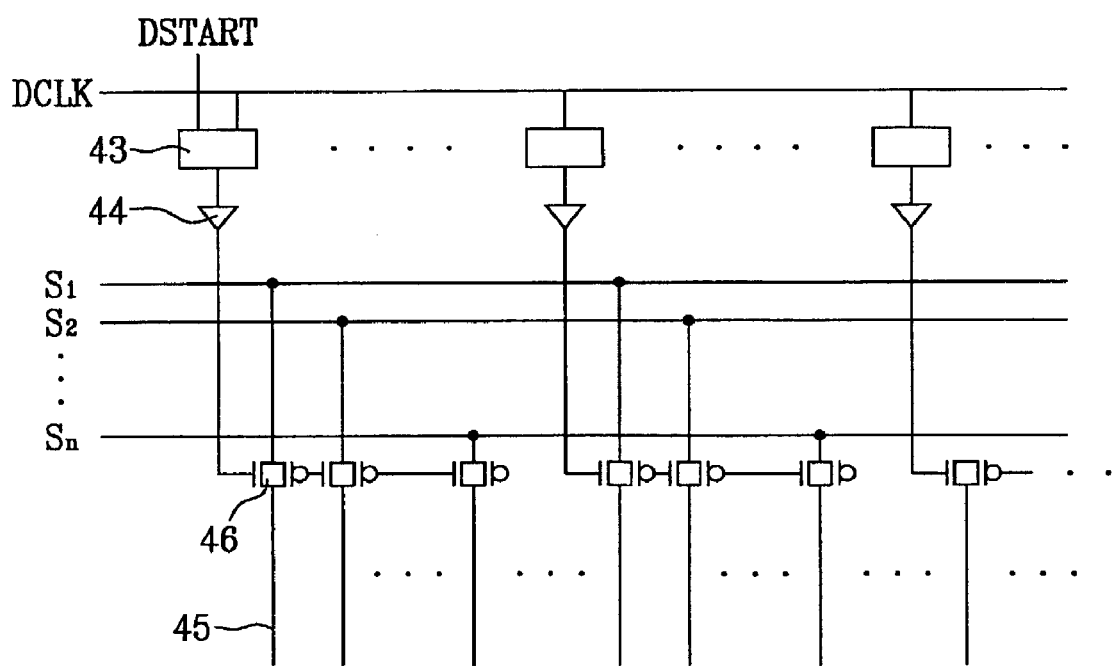
FIG. 4 is a detailed view illustrating a data driving circuit in FIG. 3.
Figure 5A:
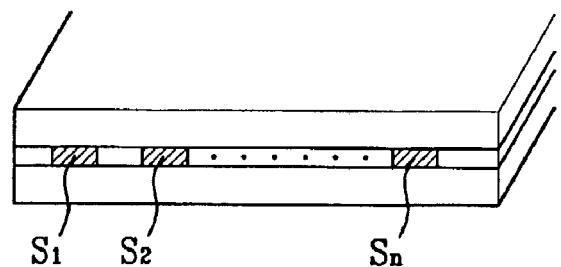
FIG. 5A is a cross-sectional view illustrating signal lines of FIG. 4.
Figure 5B:
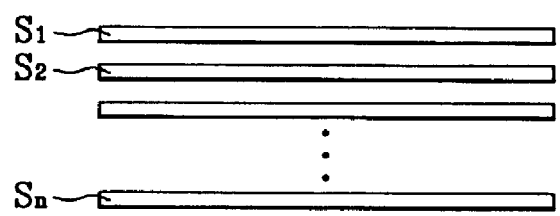
FIG. 5B is a plan view illustrating signal lines of FIG. 4.

In a preferred embodiment of the present invention, when forming a plurality of metal lines on the glass substrate 201, a plurality of signals lines S1–Sn mentioned in FIG. 4 are formed in a multi-layer structure so as to minimize the non-active area or non-display area of the LCD panel. FIGS. 7 to 11 are cross-sectional views of an LCD device according to first, second, third and fourth exemplary embodiments of the present invention.

Figure 7:
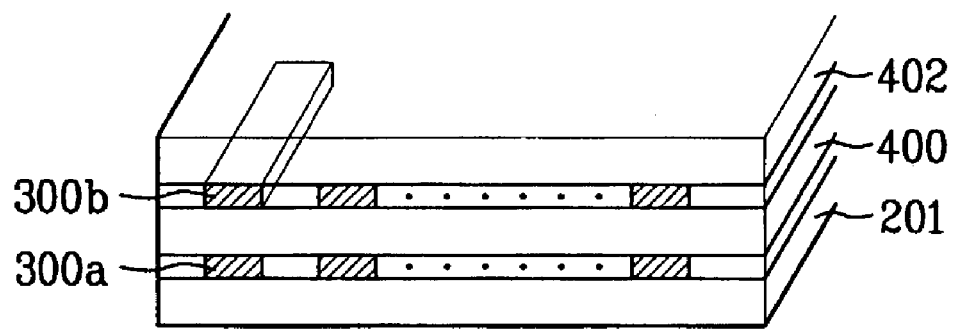
FIGS. 7 to 11 are cross-sectional views of signal lines in an LCD device according to the first to fourth exemplary embodiments of the present invention.

As shown in FIG. 7, a plurality of signal lines 300a and 300b are formed over an insulating layer 201 (or glass substrate) as two layers. Insulating layer 400 is interposed in-between each layer having the plurality of signal lines 300a and 300b. Insulating layer 402 is formed over both the plurality of signal lines 300a and 300b, and over the insulating layer 400. More specifically, the plurality of signal lines 300a and 300b are a plurality of signal lines S1–Sn for applying signals to a plurality of data lines 45, as shown in FIG. 4. When the plurality of signal lines 300a and 300b are formed as two layers, the signal lines 300a can be made from a metal layer used also to form the drain electrode 211 of FIG. 6E, and the signal lines 300b are made of a metal layer also used to form the pixel electrode 214 of FIG. 6F. In the alternative, the signal lines 300a can be made from a metal layer used to form the gate electrode 208 of FIG. 6C and the signal lines 300b can be made from a metal layer used to form the pixel electrode 214 of FIG. 6F. In another alternative, the signal lines 300a can be made from a metal layer used to form the gate electrode 208 of FIG. 6C and the signal lines 300b can be made from a metal layer used to form the drain electrode 211 of FIG. 6E.

In FIG. 7, the plurality of signal lines 300a and 300b are formed as two layers. More specifically, the signal lines 300b of one layer overlap the signal lines 300a of another layer. However, more than two metal layers can be used in the multi-layer structure of the present invention. For example, the plurality of signal lines can be formed in three layers by also using a metal layer that forms the gate line. In the case of a reflecting type LCD panel, a fourth layer could be added in addition to the third from the metal layer for forming the gate line by using the metal layer for forming a reflecting electrode. In the alternative, the plurality of layers having the signal lines can be made of metal layers different than the metal layers used to form pixel units in the active region or display part of the LCD panel.

Figure 8:
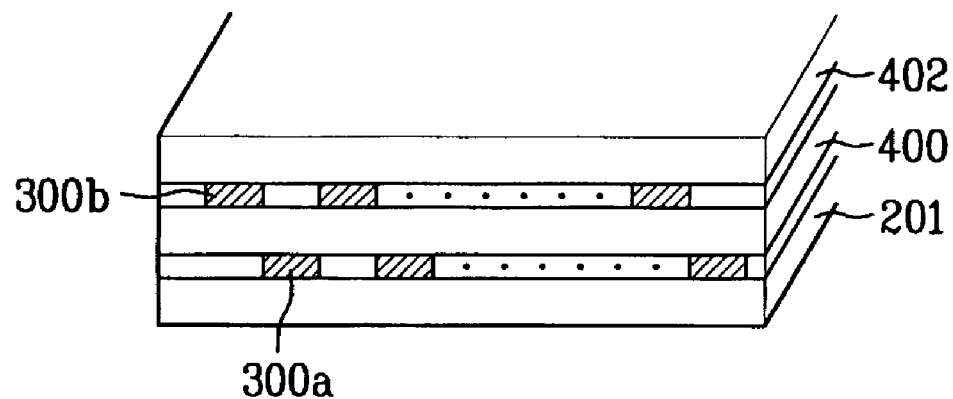

In the first exemplary embodiment of the present invention, the two layers respectively having the plurality of signal lines 300a and 300b directly overlap each other such that signal interference may be generate between the two layers. Further, a short circuit may occur between signal lines of the two layers 300a and 300b if the insulating layer is damaged. FIG. 8 is a diagram illustrating signal lines of an LCD panel according to a second exemplary embodiment of the present invention in which the signal lines 300a and 300b are not overlapped.

Referring to FIG. 8, two layers respectively having a plurality of metal lines 300a and 300b are formed over an insulating layer 201. Insulating layer 400 is interposed in-between each layer having the plurality of signal lines 300a and 300b. Insulating layer 402 is formed over the plurality of metal lines 300a and 300b, and over the insulating layers 400. As shown in FIG. 8, respective signal lines 300a of one layer are offset from the respective signal lines 300b of the other layer. The offset can either be a complete offset, as shown in FIG. 8, or a partial offset. By offsetting the signal lines of one layer from another, signal interference between the signal lines of the two layers can be prevented. Further, short circuits between signal lines of two layers due to failures in appropriately manufacturing insulating layers can be prevented. The second exemplary embodiment of the present invention can also be applied to a multi-layer structure having more than two layers of signal lines.

Figure 9:
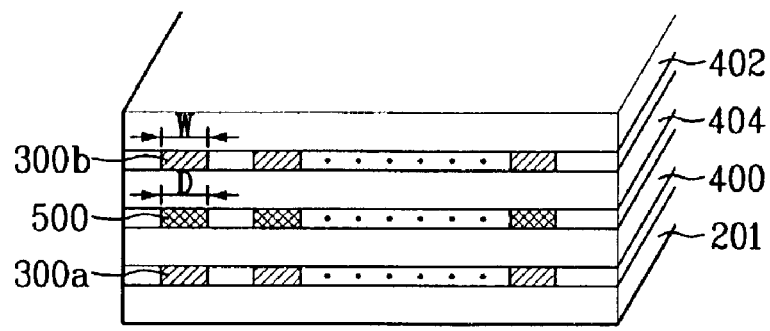

FIG. 9 is a cross-sectional view of signal lines in an LCD panel having a polycrystalline-silicon TFT according to a third exemplary embodiment of the present invention. As shown in FIG. 9, a plurality of signal lines 300a and 300b are formed on an insulating layer 201 as two layers, and another layer of grounding lines 500 are interposed between the two layers of signal lines 300a and 300b. Each of the grounding lines 500 is directly in between the signal lines 300a and 300b of the two layers that overlap one another.

Insulating layers 400 and 404 are interposed between each layer of signal lines 300a and 300b, and grounding lines 500. Insulating layer 402 is formed over signal lines 300a and 300b, grounding lines 500, and over the insulating layers 400 and 404. For example, in a reflecting type LCD panel, the signal lines 300a and 300b are respectively made from metal layers also used for respectively making a drain electrode and a pixel electrode, the grounding lines 500 is made from a metal layer also used for making a reflecting electrode. In another example, in a reflecting type LCD panel when a metal layer for a reflecting electrode is also formed above a pixel electrode, the signal lines 300a and 300b are respectively made of metal layers for a drain electrode and a reflecting electrode, and the grounding lines 500 are made from the metal layer used for making the pixel electrode.

Figure 10:
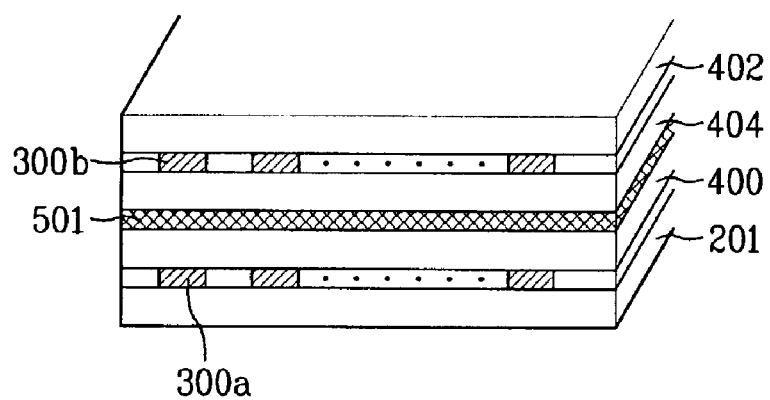

The grounding lines 500 are positioned in between the two layers of the signal lines 300a and 300b, and run in the same direction as the signal lines 300a and 300b. The grounding lines 500 have a width D that is the same as a width W of the signal lines 300a and 300b, or greater than the width W of the signal lines 300a and 300b (D>W). The width D of the grounding lines 500 being equal to or greater than the width W of the signal lines 300a and 300b, prevents signal interference between the two layers of signal lines 300a and 300b. As shown in FIG. 10, a plate-type grounding line 501 may instead be formed to prevent signal interference.

Figure 11:
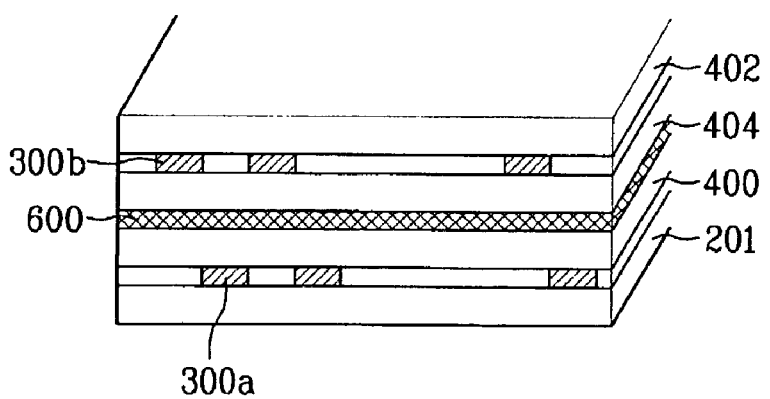
Figure 12:
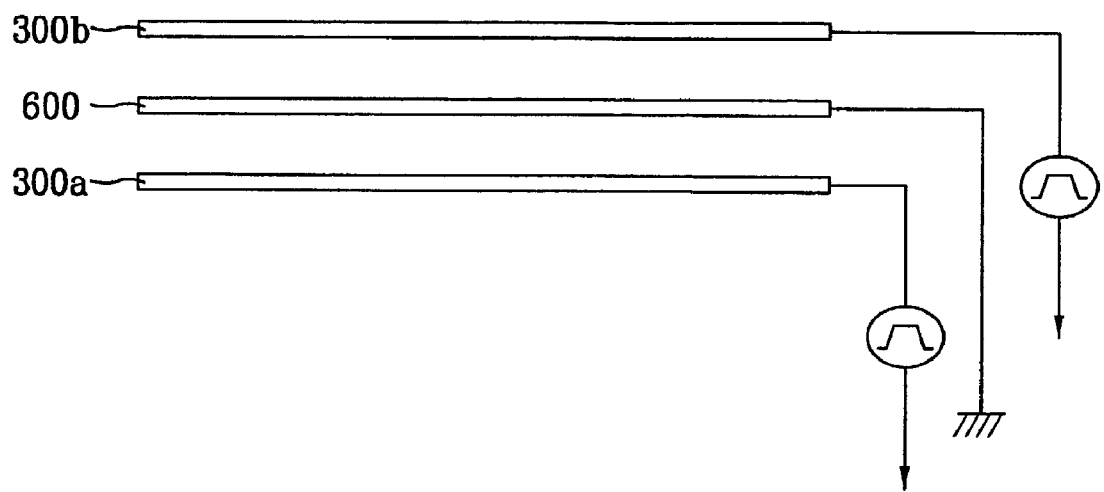
FIG. 12 shows an equivalent circuit of the exemplary embodiments of the present invention.

FIG. 11 is a cross-sectional illustrating lines of an LCD panel for a polycrystalline-silicon TFT according to a fourth exemplary embodiment of the present invention. FIG. 12 shows an equivalent circuit of the exemplary embodiment of the present invention. Referring to FIG. 11 and FIG. 12, a plurality of signal lines 300a and 300b are formed over an insulating layer 201 as two layers. A plate-type grounding line 600 is interposed between the two layers respectively having the plurality of signal lines 300a and 300b so as to prevent signal interference. Insulating layer 400 is interposed in between signal layer 300a and the plate-type grounding line 600. Insulating layer 404 is interposed in-between signal layer 300b and the plate-type grounding line 600. Insulating layer 402 is formed over the plurality of metal lines 300a and 300b, and over both of the insulating layers 400 and 404.

In the exemplary embodiments discussed above, two layers of signal lines are formed. However, the invention is not limited to just two layers of signal lines. The signal lines can be formed in any number of layers that may have a grounding line in between some or all of the layer to reduce the non-active or non-display area of an LCD panel. Further, it is possible to prevent the signal interference between the signal lines of the two layers by interposing the grounding line between the electrical lines.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A flat display device including an active area with data lines, gate lines and pixel electrodes for displaying an image and a non-active area in which drive circuits apply data signals to the data lines of the active area from signal lines, comprising:
   a first signal layer of first signal lines in the non-active area;
   a second signal layer of second signal lines over the first signal layer in the non-active area;
   a first insulating layer between the first and second signal layers; and
   a grounding layer having a plurality of grounding lines between the first and second signal layers, each of the plurality of grounding lines positioned between a first signal line and a second signal line.

2. The flat display device of claim 1, further comprising a third signal layer of third signal lines.

3. The flat display device of claim 2, further comprising a second insulating layer between the second and third signal layers.

4. The flat display device of claim 1, wherein the first signal lines are offset from the second signal lines.

5. The flat display device of claim 4, wherein the first signal lines are partially offset from the second signal lines.

6. The flat display device of claim 1, wherein the first signal lines overlap the second signal lines.

7. A flat display device including an active area for displaying an image and a non-active area in which drive circuits apply data signals to the active area from signal lines, comprising:
   a first signal layer of first signal lines in the non-active area;
   a second signal layer of second signal lines over the first signal layer in the non-active area;
   a grounding layer having a grounding line between the first and second signal layers, wherein a width of the grounding line is greater than a width of a first signal line.

8. The flat display device of claim 7, wherein the first signal lines are offset from the second signal lines.

9. The flat display device according to claim 7, wherein the grounding line is directly between first and second signal lines that overlap one another.

10. The flat display device of claim 7, wherein the grounding line is a plate-type grounding line separating the first and second signal lines.

11. A flat display device including an active area for displaying an image and a non-active area in which drive circuits apply data signals to the active area from signal lines, comprising:
   a first signal layer of first signal lines in the non-active area;
   a second signal layer of second signal lines in the non-active area;
   a first insulating layer between the first and second signal layers;
   a third signal layer of third signal lines;
   a second insulating layer between the second and third signal layers; and
   a grounding layer having a grounding line between the first and second insulating layers.

12. The flat display device of claim 11, wherein the grounding line is a plate-type grounding line separating the first and second signal lines.

13. The flat display device of claim 11, wherein the first signal lines are offset from the second signal lines.

14. The flat display device of claim 11, wherein the first signal lines are partially offset from the second signal lines.

* * * * *